US006725336B2

(12) United States Patent
Cherabuddi

(10) Patent No.: US 6,725,336 B2
(45) Date of Patent: Apr. 20, 2004

(54) DYNAMICALLY ALLOCATED CACHE MEMORY FOR A MULTI-PROCESSOR UNIT

(75) Inventor: Rajasekhar Cherabuddi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 90 days.

(21) Appl. No.: 09/838,921

(22) Filed: Apr. 20, 2001

(65) Prior Publication Data

US 2002/0184445 A1 Dec. 5, 2002

(51) Int. Cl.[7] .............................................. G06F 12/08
(52) U.S. Cl. ....................................... 711/129; 128/130
(58) Field of Search ................................ 711/129, 128, 711/130

(56) References Cited

U.S. PATENT DOCUMENTS

| | | | | |
|---|---|---|---|---|
| 5,357,623 A | * | 10/1994 | Megory-Cohen | 711/129 |
| 5,978,888 A | * | 11/1999 | Arimilli et al. | 711/128 |
| 6,058,456 A | * | 5/2000 | Arimilli et al. | 711/129 |
| 6,347,358 B1 | * | 2/2002 | Kuwata | 711/113 |
| 6,381,676 B2 | * | 4/2002 | Aglietti et al. | 711/133 |
| 6,446,168 B1 | * | 9/2002 | Normoyle et al. | 711/128 |
| 6,457,102 B1 | * | 9/2002 | Lambright et al. | 711/129 |
| 6,480,941 B1 | * | 11/2002 | Franke et al. | 711/153 |
| 6,493,800 B1 | * | 12/2002 | Blumrich | 711/129 |
| 2001/0014931 A1 | * | 8/2001 | Aglietti et al. | 711/129 |
| 2002/0116576 A1 | * | 8/2002 | Keshava et al. | 711/118 |

* cited by examiner

Primary Examiner—Hiep T. Nguyen
(74) Attorney, Agent, or Firm—Martine & Penilla, LLP

(57) ABSTRACT

The resources of a partitioned cache memory are dynamically allocated between two or more processors on a multi-processor unit (MPU). In one embodiment, the MPU includes first and second processors, and the cache memory includes first and second partitions. A cache access circuit selectively transfers data between the cache memory partitions to maximize cache resources. In one mode, both processors are active and may simultaneously execute separate instruction threads. In this mode, the cache access circuit allocates the first cache memory partition as dedicated cache memory for the first processor, and allocates the second cache memory partition as dedicated cache memory for the second processor. In another mode, one processor is active, and the other processor is inactive. In this mode, the cache access circuit allocates both the first and second cache memory partitions as cache memory for the active processor.

17 Claims, 4 Drawing Sheets

DYNAMICALLY ALLOCATED CACHE MEMORY FOR A MULTI-PROCESSOR UNIT

BACKGROUND

1. Field of Invention

This invention relates generally to multiprocessor computer system and specifically to cache memory of multiprocessor computer systems.

2. Description of Related Art

Some manufactures combine two or more central processing units (CPUs) on a single chip and sell the chip as a multi-processor unit (MPU). The MPU takes advantage of parallel processing to increase performance over a single CPU. An MPU typically includes a cache memory to store data in anticipation of future use by the CPUs. The cache memory is smaller and faster than the MPU's main memory, and thus can transfer data to the CPUs in much less time than data from the main memory. When data requested by the CPUs is in the cache memory, there is a cache hit, and CPU performance approaches the speed of the cache memory. Conversely, when there is a cache miss, the requested data must be retrieved from main memory, and thus CPU performance approaches the speed of main memory. Thus, increased performance may be achieved by maximizing the percentage of cache hits during operation.

Some MPU architectures include a single cache memory that is shared by each of its CPUs. Since data stored in the shared cache memory is shared by each CPU on the chip, it is not necessary to store duplicate sets of data, which increases cache efficiency. Further, if one of the CPUs on the chip becomes defective, or is otherwise not required for a particular operation, the other CPU(s) may still access the entire cache memory. However, since more than one CPU may access the same cache memory locations, chip-level snoop operations are required between the CPUs on each MPU. These snoop operations are in addition to any system-level snoop operations between MPUs on a common bus. The additional circuitry required to perform the chip-level snoop operations undesirably increase the size and complexity of the associated cache controllers.

Other MPU architectures include a dedicated cache memory for each of its CPUs. Since only one CPU has access to any given cache memory location, snoop operations between the CPUs on the MPUs may be performed at the system-level rather than the chip-level. Accordingly, the cache controllers for dedicated cache memories are smaller and simpler than the cache controllers for a shared cache memory. However, if one of the CPUs becomes defective or is otherwise not required for a particular application, its dedicated cache memory is not accessible by the other CPU(s), thereby wasting cache resources.

Thus, there is a need for better management of cache resources on an MPU without requiring large and complicated cache controllers.

SUMMARY

A method and apparatus are disclosed that overcome problems in the art described above. In accordance with the present invention, the resources of a partitioned cache memory are dynamically allocated between two or more processors on a multi-processor unit (MPU) according to a desired system configuration or to the processing needs of the processors. In some embodiments, the MPU includes first and second processors, and the cache memory includes first and second partitions. In one embodiment, each cache memory partition is a 2-way associative cache memory. A cache access circuit provided between the cache memory and the processors selectively transfers addresses and data between the first and/or second CPUs and the first and/or second cache memory partitions to maximize cache resources.

In one mode, both processors are set as active, and may simultaneously execute separate instruction threads. In this two-thread mode, the cache access circuit allows each processor to use a corresponding cache memory partition as a dedicated cache. For example, during cache read operations, the cache access circuit provides addresses from the first processor to the first cache memory partition and addresses from the second processor to the second cache memory partition, and returns data from the first cache memory partition to the first processor and data from the second cache memory partition to the second processor. Similarly, during cache write operations, the cache access circuit routes addresses and data from the first processor to the first cache memory partition and routes addresses and data from the second processor to the second cache memory partition. Thus, the first and second processors may use the first and second cache memory partitions, respectively, as dedicated 2-way associative caches.

In another mode, one processor is set as the active processor, and the other processor is set as the inactive processor. In this one-thread mode, the cache access circuit allows the active processor to use both the first and second cache memory partitions. For example, during cache read operations, the cache access circuit provides addresses from the active processor to both the first and second cache memory partitions, and returns matching data from the first and second cache memory partitions to the active processor. Similarly, during cache write operations, the cache access circuit returns addresses and data from the active processor to the first and second cache memory partitions. In this manner, the active processor may collectively use the first and second cache memory partitions as a 4-way associative cache.

The ability to dynamically allocate cache resources between multiple processors advantageously allows the entire cache memory to be used, irrespective of whether one or both processors are currently active, thereby maximizing cache resources while allowing for both one-thread and two-thread execution modes. In addition, the present invention may be used to maximize cache resources when one of the on-board processors is defective. For example, if one processor is found to be defective during testing, it may be set as inactive, and the cache access circuit may allocate the entire cache memory to the other processor.

BRIEF DESCRIPTION OF THE DRAWINGS

Like reference numerals refer to corresponding parts throughout the drawing figures.

DETAILED DESCRIPTION

The present invention is described below with reference to an MPU having two processors for simplicity only. It is to be understood that embodiments of the present invention are equally applicable to MPUs having any number of processors. Further, although described as having 2-way associative cache memory partitions, the dynamically allocated cache memory of the present invention may be configured for any desired level of associativity. In addition, the particular logic levels assigned to signals discussed herein is arbitrary and, thus, may be reversed where desirable. Accordingly, the present invention is not to be construed as limited to specific examples described herein but rather includes within its scope all embodiments defined by the appended claims.

Figure 1:
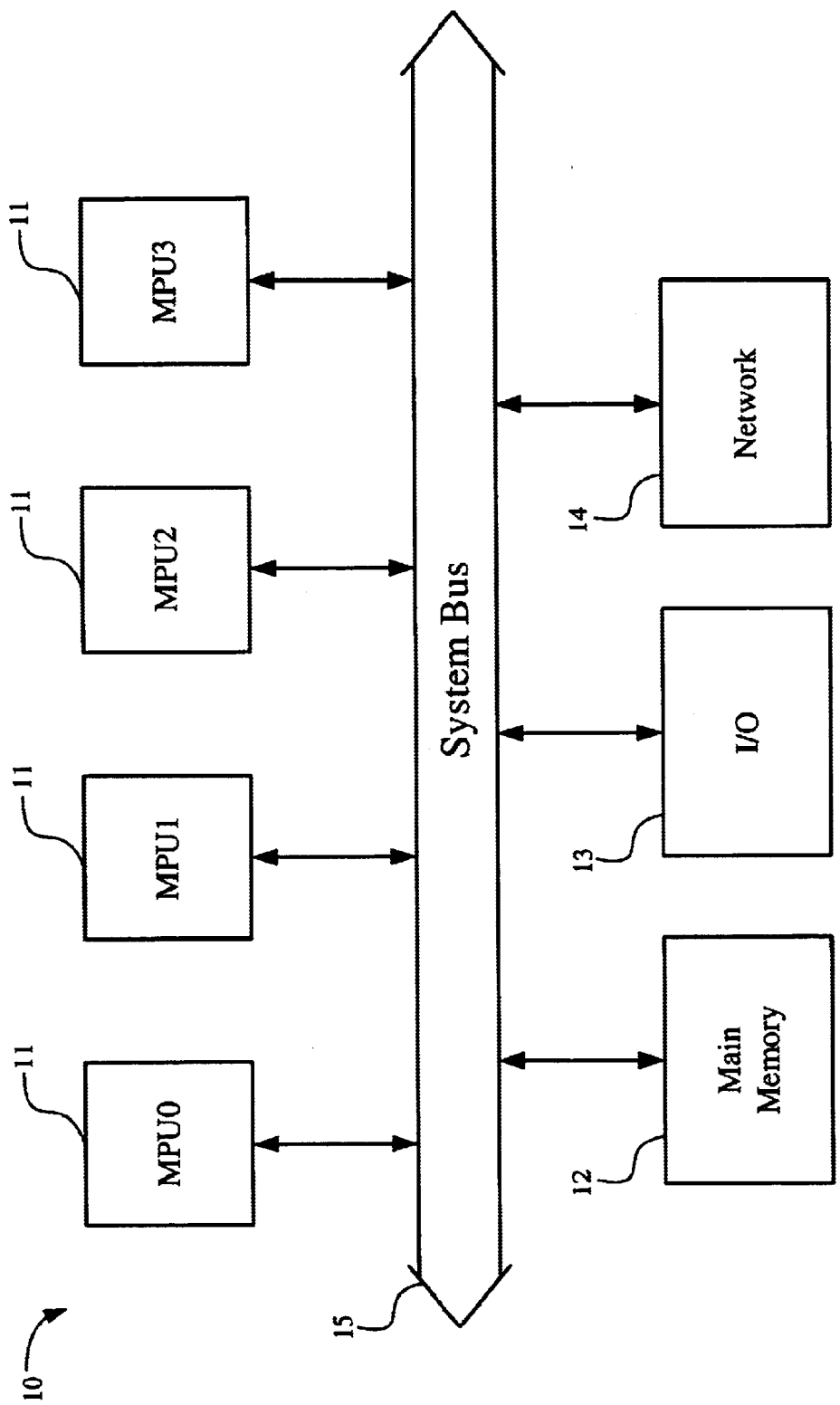
FIG. 1 is a block diagram of a computer system within which embodiments of the present invention may be implemented.

FIG. 1 shows a computer system 10 within which embodiments of the present invention may be implemented. System 10 is shown to include four MPUs 11 connected to each other and to a main memory 12, an input/output (I/O) device 13, and a network 14 via a system bus 15. Main memory 12 is shared by MPUs 11, and may be any suitable random access memory (RAM) such as, for example, DRAM. I/O device 13 allows a user to interact with system 10, and may include, for example, a computer monitor, keyboard, and/or mouse input. Network 14 may be any suitable network such as, for example, a local area network, a wide area network, and/or the Internet. Additional devices may be connected to the system bus 15 as desired.

Figure 2:
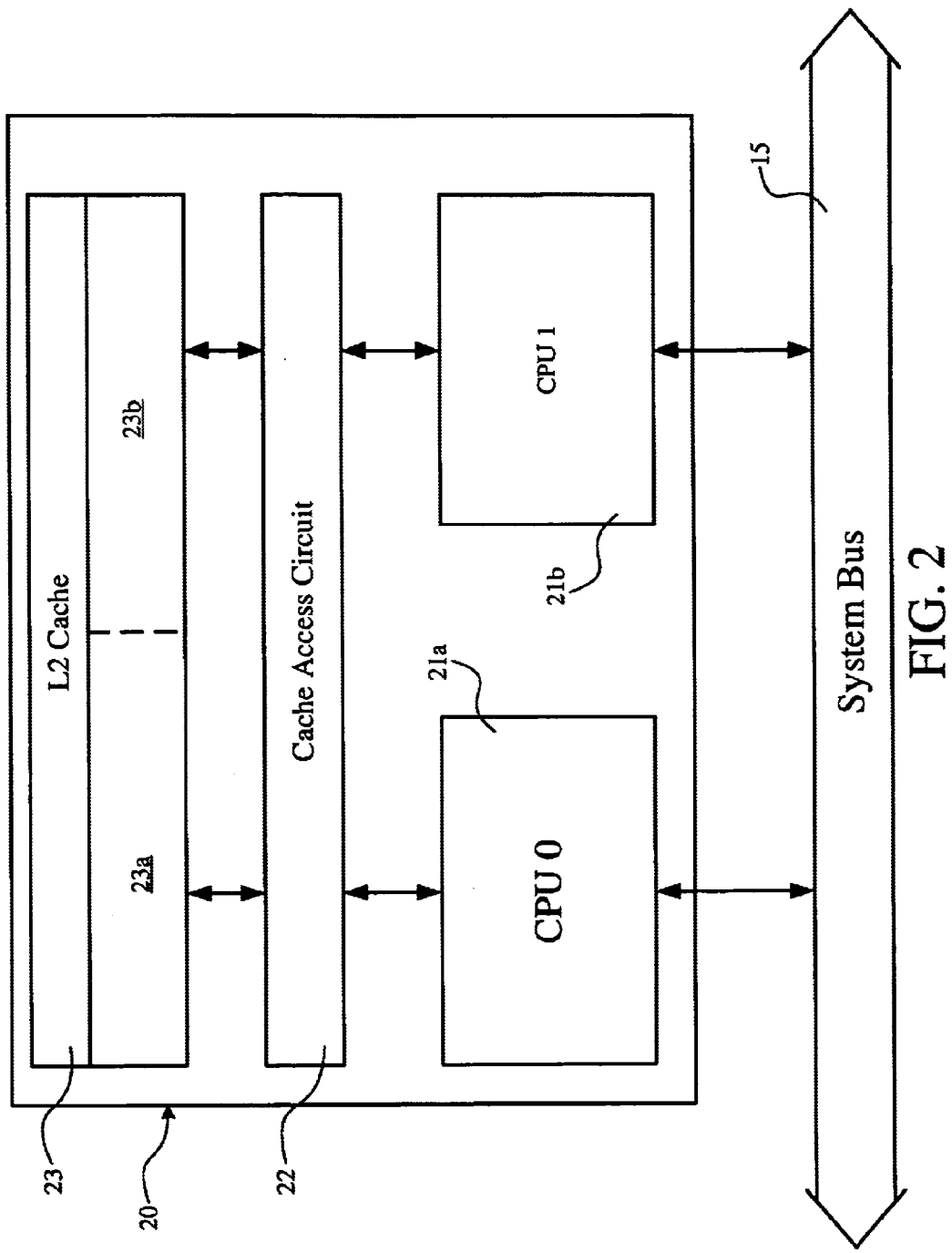
FIG. 2 is a block diagram of a multi-processor unit having a dynamically allocated cache memory in accordance with the present invention.

FIG. 2 shows an MPU 20 that is one embodiment of MPU 11 of FIG. 1. MPU 20 is shown to include first and second processors such as central processing units (CPUs) 21a–21b, a cache access circuit 22, and a dynamically allocated cache memory 23. CPUs 21a–21b are well-known processing devices. Cache memory 23 is partitioned into first and second cache memory partitions 23a–23b, and is preferably a high speed cache memory device such as SRAM, although other cache devices may be used. For the purpose of discussion herein, each cache memory partition 23a–23b is configured as a 2-way associative cache memory. Of course, in actual embodiments, the cache memory partitions may be configured for other levels of associativity.

Cache access circuit 22 selectively couples the first and/or second CPUs 21a–21b to the first and/or second cache memory partitions 23a–23b. As explained in detail below, cache access circuit 22 allows the resources of cache memory 23 to be dynamically allocated between the first and second CPUs 21a–21b according to each CPU's processing requirements to more efficiently utilize cache resources.

Referring also to FIG. 1, system 10 includes well-known system operating software that assigns tasks of one or more computer programs running thereon to the various MPUs 20 for execution. The operating software, which is often referred to as the system kernel, also assigns tasks between the CPUs 21a–21b of each MPU 20. For applications that include a single instruction execution thread and are thus best executed using only one CPU 21, e.g., for applications having a highly sequential instruction code, the kernel assigns all the tasks to one CPU and idles the other CPU. Conversely, for applications that can be divided into two parallel instruction execution threads, e.g., for applications having parallel execution loops, the kernel may assign different threads to CPUs 21a–21b for simultaneous execution therein.

Figure 3:
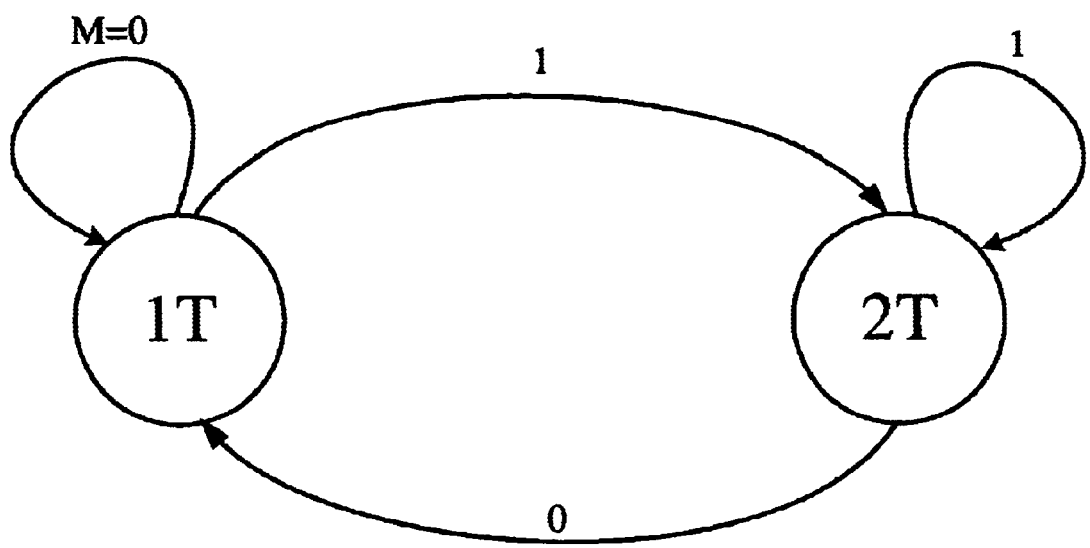
FIG. 3 is a state diagram illustrating state transitions for the multi-processor unit of FIG. 2.

FIG. 3 illustrates state transitions of MPU 20 between a one-thread (1T) state and a two-thread (2T) state. In one embodiment, upon power-up of MPU 20, the kernel sets a mode signal M=0 to initialize MPU 20 to the 1T state. The kernel sets one of the CPUs 21 to an active state and sets the other CPU 21 to an inactive state. For purposes of discussion herein, during the 1T state, the kernel sets CPU 21a as the active CPU and sets CPU 21b as the inactive CPU, although in other embodiments the kernel may set CPU 21b as the active CPU and set CPU 21a as the inactive CPU. While in the 1T state, the kernel assigns tasks of the computer program(s) only to the active CPU 21a, while the other CPU 21b remains idle. In response to M=0, cache access circuit 22 couples the first CPU 21a to both the first and second cache memory partitions 23a–23b to allow the first CPU 21a to use all resources of cache memory 23. In this state, the active CPU 21a may use cache memory partitions 23a–23b as a 4-way associative cache memory.

If, during execution of the computer program(s), the kernel determines that certain tasks may be executed in parallel, and thus may be divided into 2 threads, the kernel may transition MPU 20 to the 2T state by changing the mode signal to M=1. When M=1, the kernel sets both CPUs 21a–21b to the active state, and thereafter assigns one execution thread to CPU 21a and another execution thread to CPU 21b in a well-known manner. In response to M=1, dirty data in cache memory partition 23b is written back to main memory 12 using a well-known writeback operation, thereby flushing cache memory partition 23b. The cache access circuit 22 couples the first CPU 21a to the first cache memory partition 23a for exclusive access thereto, and couples the second CPU 21b to the second cache memory partition 23b for exclusive access thereto. In this state, CPU 21a may use cache memory partition 23a as a dedicated 2-way associative cache memory, and CPU 21b may use cache memory partition 23b as a dedicated 2-way associative cache memory.

Thereafter, if the kernel determines that only one of CPUs 21a–21b is necessary for a particular instruction code sequence, the kernel may transition MPU 20 to the 1T state by changing the mode signal to M=0, flushing the second cache memory partition 23b, and then assigning execution of the instruction code sequence to the active CPU 21a.

By dynamically allocating resources of cache memory 23 in response to specific needs of associated CPUs 21a–21b, embodiments of the present invention maximize cache performance by ensuring that both cache memory partitions 23a–23b are utilized, irrespective of whether one or both CPUs 21a–21b are active. Thus, in the 1T state, both cache memory partitions 23a–23b are allocated to the active CPU, and in the 2T state, each cache memory partition 23a and 23b is allocated only to its corresponding CPU 21a and 21b, respectively. Since allocation of cache memory partitions 23a–23b is controlled by cache access circuit 22, cache memory 23 does not require any special hardware, and thus may be of conventional architecture. Further, since cache memory 23 is not shared between CPUs 21a–21b, all snoop operations may be performed at the system level. As a result, the cache controllers (not shown in FIG. 2) in CPUs 21a–21b are much simpler and occupy less silicon area than cache controllers for shared cache memory systems.

The ability to dynamically allocate cache resources is also useful in situations where portions of MPU 20 are defective. For example, during testing of MPU 20, if CPU 21b is found to be defective or otherwise unusable, the kernel may be configured to maintain MPU 20 in the 1T state, where CPU 21a is the active CPU and has access to both cache memory partitions 23a–23b, and CPU 21b is inactive. Thus, in contrast to MPUs that have dedicated cache memory for each on-board CPU, the failure of one CPU 21 on MPU 20 does not render any part of cache memory 23 inaccessible.

Figure 4:
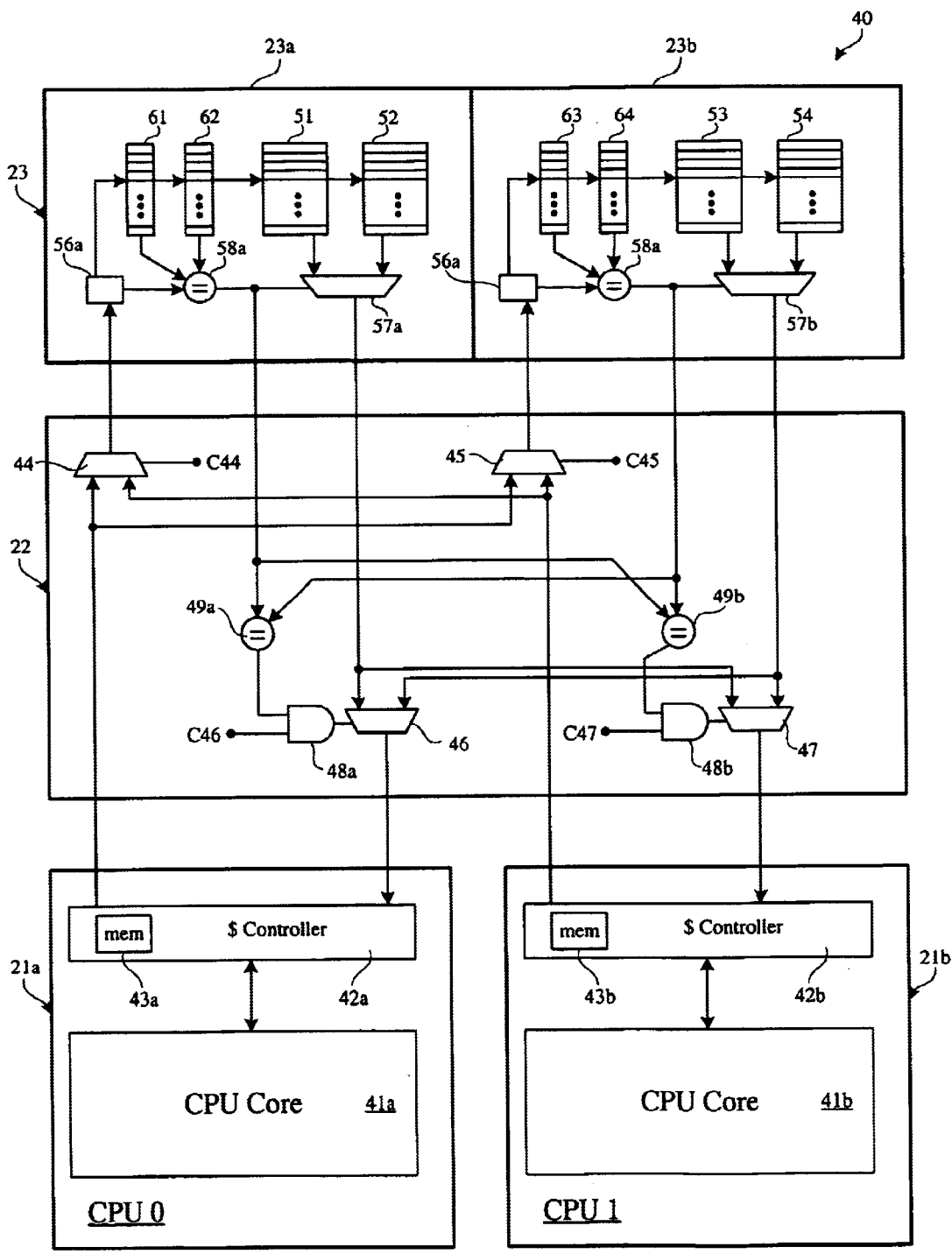
FIG. 4 is block diagram of one embodiment of the multi-processor unit of FIG. 2.

FIG. 4 shows an MPU 40 that is one embodiment of MPU 20, and includes CPUs 21a–21b, cache access circuit 22, and cache memory partitions 23a–23b. Each CPU 21 is shown to include a CPU core 41 and a cache controller 42. Each cache controller 42, which may be of conventional architecture, transfers address and data between its associated CPU core 41 and cache access circuit 22, and includes (or is associated with) a memory element 43. Memory element 43 may be any suitable memory device including, for example, a register or memory cell. Although shown in FIG. 4 as being internal to cache controller 42, memory element 43 may be external to cache controller 42. CPU core 41 includes other well-known elements of CPU 21 including, for instance, L1 cache memory, instruction units, fetch and decode units, execution units, register files, write cache(s), and so on.

Cache memory partition 23a includes two data RAM arrays 51–52 having corresponding searchable tag arrays 61–62, respectively, while cache memory partition 23b includes two data RAM arrays 53–54 having corresponding searchable tag arrays 63–64, respectively. Cache memory partition 23a includes a well-known address converter 56a that converts a main memory address received from cache access circuit 22 into a cache address that is used to concurrently address the tag arrays 61–62 and the data arrays 51–52. Similarly, cache partition 23b includes a well-known address converter 56b that converts an address received from cache access circuit 22 into a cache address that is used to concurrently address the tag arrays 63–64 and the data arrays 53–54.

Data arrays 51–54 each include a plurality of cache lines for storing data retrieved from main memory 12. Cache lines in data arrays 51–54 may be any suitable length. In one embodiment, each cache line of data arrays 51–54 stores 32 Bytes of data. Each data array 51–54 also includes a well-known address decoder (not shown for simplicity) that selects a cache line for read and write operations in response to a received cache index. Data arrays 51–52 provide data at a selected cache line to a MUX 57a, and data arrays 53–54 provide data at selected cache line to a MUX 57b.

Tag arrays 61–64 each include a plurality of lines for storing tag information for corresponding cache lines in data arrays 51–54, respectively. Tag arrays 61–62 provide tags at the selected cache line to a comparator 58a which, in response to a comparison with a tag address received from address converter 56a, generates a select signal for MUX 57a. Similarly, tag arrays 62 and 63 provide tags at the selected cache line to a comparator 58b which, in response to a comparison with a tag address received from address converter 56b, generates a select signal for MUX 57b. Comparators 58a and 58b are well-known.

Cache access circuit 22 is shown to include four multiplexers (MUXs) 44–47, two AND gates 48a and 48b, and two comparators 49a and 49b, although after reading this disclosure it will be evident to those skilled in the art that various other logic configurations may be used to selectively route addresses and data between MPU 20 and cache memory 23. MUXes 44–45 selectively provide address information from CPUs 21a–21b to cache memory partitions 23a–23b, respectively, and MUXes 46–47 selectively provide data from cache memory partitions 23a–23b to CPUs 21a–21b, respectively. MUXes 44–45 are controlled by control signals C44 and C45, respectively. MUX 46 is controlled by AND gate 48a, which includes a first input terminal coupled to receive a control signal C46 and a second input terminal coupled to comparator 49a. Comparator 49a includes input terminals coupled to receive select signals from comparators 58a and 58b of cache memory 23. MUX 47 is controlled by AND gate 48b, which includes a first input terminal coupled to receive a control signal C47 and a second input terminal coupled to comparator 49b. Comparator 49b includes input terminals coupled to receive select signals from comparators 58a and 58b of cache memory 23. Comparators 49a and 49b are well-known. Values for signals C44 and C46 may be stored in memory 43a of cache controller 42a, and values for signals C45 and C47 may be stored in memory 43b of cache controller 42b.

Specifically, MUX 44 selectively provides address and data information to cache memory partition 23a from either CPU 21a or CPU 21b in response to C44, and MUX 45 selectively provides address and data information to cache memory partition 23b from either CPU 21a or CPU 21b in response to C45. MUX 46 selectively returns data to CPU 21a from either cache memory partition 23a or 23b in response to AND gate 48a, and MUX 47 selectively returns data to CPU 21b from either cache memory partition 23a or 23b in response to AND gate 48b.

For simplicity, MUXes 44–45 are shown in FIG. 4 as routing both address and data information to cache memory partitions 23a–23b, respectively. However, in other embodiments, cache access circuit 22 may include a duplicate set of MUXes to route data to respective cache memory partitions 23a–23b, in which case MUXes 44–45 route only address information to respective cache memory partitions 23a–23b.

When MPU 20 is in the 2T state (e.g., when M=1), each CPU 21a–21b is processing its own instruction thread, and the kernel sets signals C44–C47 to logic low (i.e., logic 0) to simultaneously provide CPU 21a with exclusive use of cache memory partition 23a and to provide CPU 21b with exclusive use of cache memory partition 23b. Thus, C44=0 forces MUX 44 to provide an address or data from CPU 21a to cache memory partition 23a, C45=0 forces MUX 45 to provide an address or data from CPU 21b to cache memory partition 23b, C46=0 forces the output of AND gate 48a to logic 0 to force MUX 46 to provide data from cache memory partition 23a to CPU 21a, and C47=0 forces the output of AND gate 48b to logic 0 to force MUX 47 to provide data from cache memory partition 23b to CPU 21b.

To request data from cache memory partition 23a, CPU 21a provides a main memory address to address converter 56a via MUX 44. Address converter 56a converts the main memory address to a cache address that includes a tag address and a cache index. The cache index is used to select a cache line in data arrays 51–52 and associated tag arrays 61–62. If there is data stored at the selected cache line in data arrays 51 and/or 52, the data is read out to MUX 57a. Also, the tag fields from the selected line of tag arrays 61–62 are read out to comparator 58a, which also receives the tag address from address converter 56a. Comparator 58a compares the tag address with tag fields provided by tag arrays 61–62, and in response thereto provides a select signal to MUX 57a that selects whether data from data array 51 or 52 (or neither, if there is no matching data) is read out to MUX 46 of cache access circuit 22. Since C46=0, MUX 46 provides matching data from cache memory partition 23a to cache controller 42a of CPU 21a.

CPU 21b may simultaneously request data from cache memory partition 23b in a similar manner. Thus, a main memory address provided by CPU 21b to address converter 56b via MUX 44 is converted into a cache address that includes a tag address and a cache index. The cache index selects a cache line in data arrays 53–54 and associated tag arrays 63–64. If there is data stored at the selected cache line in data arrays 53 and/or 54, the data is read out to MUX 57b.

Also, the tag fields from the selected line of tag arrays 63–64 are read out to comparator 58b, which also receives the tag address from address converter 56b. Comparator 58b compares the tag address with tag fields provided by tag arrays 63–64, and in response thereto provides a select signal to MUX 57b that selects whether data from data array 53 or 54 (or neither, if there is no matching data) is read out to MUX 47 of cache access circuit 22. Since C47=0, MUX 47 provides matching data from cache memory partition 23b to cache controller 42b of CPU 21b.

In this manner, CPU 21a may use cache memory partition 23a as a dedicated 2-way associative cache while CPU 21b simultaneously and independently uses cache memory partition 23b as a dedicated 2-way associative cache.

When MPU 20 transitions to the 1T state (e.g., M=0), the kernel sets CPU 21a as the active CPU and sets CPU 21b as the inactive CPU (as mentioned earlier, in other embodiments the kernel may set CPU 21b as the active CPU and set CPU 21a as the inactive CPU). The kernel also sets signal C44 to logic low and sets signals C45–C46 to logic high (i.e., logic 1) to provide CPU 21a with use of both cache memory partitions 23a–23b. Thus, C44=0 forces MUX 44 to provide an address or data from CPU 21a to cache memory partition 23a, C45=1 forces MUX 45 to provide the same address or data from CPU 21a to cache memory partition 23b, and C46=1 allows a result signal from comparator 49a to select whether data from cache memory partition 23a or 23b is returned to CPU 21a. Since CPU 21b is inactive, C47 is a don't care (d/c) for M=0.

To request data from both cache memory partitions 23a–23b, CPU 21a provides a main memory address to address converter 56a via MUX 44 and to address converter 56b via MUX 45. Thus, the cache address is provided to data arrays 51–54 and to tag arrays 61–64. Data arrays 51–52 read out the selected cache line to MUX 57a, and tag arrays 61–62 read out corresponding tag fields to comparator 58a. Comparator 58a compares the tag fields with the tag address received from address converter 56a, and selects which data (if any) MUX 57a forwards to MUX 46. Similarly, data arrays 53–54 read out the selected cache line to MUX 57b, and tag arrays 63–64 read out corresponding tag fields to comparator 58b. Comparator 58b compares the tag field with the tag address received from address converter 56b, and selects which data (if any) MUX 57b forwards to MUX 46.

The select signals provided by comparators 58a and 58b are compared in comparator 49a to generate a select signal that is provided to MUX 46 via AND gate 48a to select which data (if any) is returned to CPU 21a. Thus, if there is matching data in either cache memory partition 23a or cache memory partition 23b, it is returned to CPU 21a via MUX 46. In this manner, data arrays 51–54 provide a 4-way associative cache memory for CPU 21a. Values for control signals C44–C47 for the 1T and 2T states are summarized below in Table 1.

TABLE 1

| mode | C44 | C45 | C46 | C47 |
|------|-----|-----|-----|-----|
| 1T   | 0   | 1   | 1   | d/c |
| 2T   | 0   | 0   | 0   | 0   |

As discussed above, the ability to easily transition between using cache memory 23 as two dedicated 2-way associative cache memories for respective CPUs 21a–21b, and using cache memory 23 as a 4-way associative memory for only one CPU 21a, advantageously allows for use of the entire cache memory 23, irrespective of whether MPU 20 is executing one or two threads, and thereby maximizes the effectiveness of cache memory 23. Further, since CPUs 21a–21b do not simultaneously share access to the same data in cache memory 23, cache controllers 42a and 42b do not need to perform separate chip-level snoop operations, and thus are much simpler and occupy less silicon area than cache controllers for a shared cache memory system.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, although described above as having two partitions, in actual embodiments cache memory 23 may have any number of partitions.

I claim:

1. A method of dynamically allocating a cache memory between first and second central processors, comprising:
   partitioning the cache memory into first and second partitions;
   in a first mode, allocating the first cache memory partition for exclusive use by the first central processor, and allocating the second cache memory partition for exclusive use by the second central processor; and
   in a second mode, allocating the first cache memory partition and the second cache memory partition for exclusive use by the first central processor.

2. The method of claim 1, further comprising:
   during the first mode, providing access to the first cache memory partition for the first central processor and providing access to the second cache memory partition for the second central processor.

3. The method of claim 2, wherein during the first mode each cache memory partition operates as a 2-way associative cache memory.

4. The method of claim 1, further comprising:
   during the second mode, providing access to the first cache memory partition and the second cache memory partition for the first central processor.

5. The method of claim 3, wherein during the second mode the first and second cache memory partitions collectively operate as a 4-way associative cache memory.

6. The method of claim 4, further comprising:
   flushing the second cache memory partition during the second mode.

7. The method of claim 4, further comprising:
   setting the second central processor to an inactive state during the second mode.

8. A method of dynamically allocating a cache memory between first and second central processors, comprising:
   partitioning the cache memory into first and second partitions;
   selectively coupling the first cache memory partition to the first and second central processors in response to a mode signal; and
   selectively coupling the second cache memory partition to the first and second central processors in response to the mode signal;
   when the mode signal is in a first state,
     allocating the first cache memory partition as dedicated cache memory for the first central processor; and allocating the second cache memory partition as dedicated cache memory for the second central processor; and when the mode signal is in a second state,
allocating the first and second cache memory partitions as cache memory for the first central processor.

9. The method of claim 8, wherein during the first state, each cache memory partition operates as a 2-way associative cache memory.

10. The method of claim 9, wherein during the second state, the first and second cache memory partitions collectively operate as a 4-way associative cache memory.

11. The method of claim 9, further comprising:
setting the second central processor to an inactive state during the second state.

12. The method of claim 9, further comprising:
flushing the second cache partition during the second state.

13. A multi-processor system, comprising:
a first central processor;
a second central processor;
a cache memory including first and second partitions; and
a cache access circuit for selectively coupling the first cache memory partition to the first and second central processors, and for selectively coupling the second cache memory partition to the first and second central processors, wherein
when in a first mode, the cache access circuit allocates the first cache memory partition as dedicated cache memory for the first central processor, and allocates the second cache memory partition as dedicated cache memory for the second central processor; and
when in a second mode, the cache access circuit allocates both the first and second cache memory partitions as cache memory for the first central processor.

14. The system of claim 13, wherein the cache access circuit comprises:

a first multiplexer having a first input to receive data from the first central processor, a second input to receive data from the second central processor, and an output coupled to the first cache memory partition; and a second multiplexer having a first input to receive data from the first central processor, a second input to receive data from the second central processor, and an output coupled to the second cache memory partition.

15. The system of claim 14, wherein the cache control means further comprises:

a third multiplexer having a first input to receive data from the first cache memory partition, a second input to receive data from the second cache memory partition, and an output coupled to the first central processor; and a fourth multiplexer having a first input to receive data from the first cache memory partition, a second input to receive data from the second cache memory partition, and an output coupled to the second central processor.

16. The system of claim 15, wherein the cache access circuit further comprises:

a first comparator having a first input to receive a first select signal from the first cache memory partition, a second input to receive a second select signal from the second cache memory partition, and an output to provide a third select signal to a control terminal of the third multiplexer.

17. The system of claim 16, wherein the cache access circuit further comprises:

a second comparator having a first input to receive the first select signal from the first cache memory partition, a second input to receive the second select signal from the second cache memory partition, and an output to provide a fourth select signal to a control terminal of the fourth multiplexer.

* * * * *